United States Patent
Share et al.

(10) Patent No.: US 10,590,237 B2
(45) Date of Patent: Mar. 17, 2020

(54) PREPARATION OF HYPERBRANCHED POLYCARBONATE POLYOLS AND THEIR USE

(71) Applicant: BASF SE, Ludwigshafen (DE)

(72) Inventors: Paul Share, Ann Arbor, MI (US); Sebastian Berger, Ann Arbor, MI (US); David Tuerp, Mannheim (DE)

(73) Assignee: BASF SE, Ludwigshafen (DE)

(*) Notice: Subject to any disclaimer, the term of this patent is extended or adjusted under 35 U.S.C. 154(b) by 48 days.

(21) Appl. No.: 15/575,567

(22) PCT Filed: Mar. 24, 2016

(86) PCT No.: PCT/US2016/023991
§ 371 (c)(1),
(2) Date: Nov. 20, 2017

(87) PCT Pub. No.: WO2016/186727
PCT Pub. Date: Nov. 24, 2016

(65) Prior Publication Data
US 2018/0134841 A1    May 17, 2018

Related U.S. Application Data

(60) Provisional application No. 62/165,096, filed on May 21, 2015.

(51) Int. Cl.
*C08G 64/30* (2006.01)
*C08G 83/00* (2006.01)
*C08G 64/20* (2006.01)

(52) U.S. Cl.
CPC ......... *C08G 64/305* (2013.01); *C08G 83/005* (2013.01)

(58) Field of Classification Search
CPC .............................. C08G 64/30; C08G 64/305
USPC ........................................................ 528/371
See application file for complete search history.

(56) References Cited

U.S. PATENT DOCUMENTS

| | | | |
|---|---|---|---|
| 4,533,729 | A | 8/1985 | Newland et al. |
| 2002/0026015 | A1 | 2/2002 | Ramesh |
| 2004/0143130 | A1 | 7/2004 | Tillack et al. |
| 2009/0018256 | A1 | 1/2009 | Nefzger et al. |
| 2015/0018512 | A1 | 1/2015 | Heath et al. |

FOREIGN PATENT DOCUMENTS

| | | |
|---|---|---|
| DE | 10138216 A1 | 2/2003 |
| DE | 10147712 A1 | 4/2003 |

OTHER PUBLICATIONS

International Search Report & Written Opinion in International Application No. PCT/US2016/023991, dated Jun. 30, 2016 (11 pages).

*Primary Examiner* — Duc Truong
(74) *Attorney, Agent, or Firm* — Foley & Lardner LLP

(57) ABSTRACT

A process for preparing a hyperbranched polycarbonate polyol includes reacting a polyfunctional alcohol and an ester or carbonate in the presence of a catalyst and then heating the reaction mixture under azeotropic reflux conditions to form an alcohol or water. The alcohol or water by-product is then removed from the reaction mixture, thereby pushing the reaction forward.

20 Claims, No Drawings

PREPARATION OF HYPERBRANCHED POLYCARBONATE POLYOLS AND THEIR USE

CROSS-REFERENCE TO RELATED APPLICATIONS

This application is a U.S. National Phase Application under 35 U.S.C. § 371 of International Application No. PCT/US2016/023991, filed on Mar. 24, 2016, which claims benefit of U.S. Provisional Patent Application No. 62/165,096, filed on May 21, 2015. The entirety of each is incorporated herein by reference.

FIELD

The present technology is generally related to hyperbranched polycarbonate polyols. More specifically, the technology is related to a process for the preparation of hyperbranched polycarbonate polyols via an azeotropic transesterification process and use of these hyperbranched polycarbonate polyols in downstream applications.

BACKGROUND

There is a general need for high functionality, high flexibility polyols with low viscosity. These polyols are useful in a variety of industrial applications including, but not limited to, the formation of urethane in conjunction with isocyanates for foams, inks, plastics, or coatings applications. They can also be used as humectants, dispersants, emulsifiers, or solvents. These polyols can also be further functionalized with various groups, including but not limited to, acid groups and/or acrylic acid esters. The high functionality of the polyol increases the reactivity of the formulation while still allowing the formulation to remain free flowing.

SUMMARY

Provided herein is a process of preparing a hyperbranched polycarbonate polyol through a transesterification process at low temperature. The process includes contacting a polyfunctional alcohol and an ester or a carbonate with a catalyst in a solvent to form a reaction mixture; and heating the reaction mixture under azeotropic reflux conditions to form an alcohol or water. The reaction is pushed forward by the removal of the alcohol or water (produced as by-products) from the reaction mixture under the azeotropic reflux conditions.

Also provided herein is a hyperbranched polycarbonate polyol produced by the process disclosed herein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, the term "substituted," unless specifically defined differently, refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. For some groups, substituted may provide for attachment of an alkyl group to another defined group, such as a cycloalkyl group.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, isobutyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group. In general, alkyl groups may include in addition to those listed above, but are not limited to, 2-pentyl, 2-methylbutyl, 3-methylbutyl, 1,2-dimethylpropyl, 1,1-dimethylpropyl, 2,2-dimethylpropyl, 1-ethylpropyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, 2-heptyl, 3-heptyl, 2-ethylpentyl, 1-propylbutyl, 2-ethylhexyl, 2-propylheptyl, 1,1,3,3-tetramethylbutyl, nonyl, decyl, n-undecyl, n-dodecyl, n-tridecyl, iso-tridecyl, n-tetradecyl, n-hexadecyl, n-octadecyl, n-eicosyl, and the like.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6- disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, tolyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, the term "acrylate" or "methacrylate" refers to acrylic or methacrylic acid, esters of acrylic or methacrylic acid, and salts, amides, and other suitable derivatives of acrylic or methacrylic acid, and mixtures thereof.

As used herein, the term "acrylic-containing group" or "methacrylate-containing group" refers to a compound that has a polymerizable acrylate or methacrylate group.

As used herein, the term "polyol" refers to an oligomer that includes 2 or more monomer units wherein each monomer unit has at least one alcohol functionality.

As used herein, the term "repeat unit" refers to a structurally repeating unit of a polymer. A repeat unit may be a monomeric unit or an oligomeric unit (i.e., includes two or more monomeric units).

As used herein, the term "branch repeat unit" refers to a repeat unit that has a valence of three or more and is covalently attached to, or capable of covalently attaching to, three or more repeat units. Thus, for example, a styrene repeat unit in a polystyrene polymer does not constitute a branch repeat unit.

As used herein, the term "backbone" refers to a longest chain of a polymer.

As used herein, the term "oligomer" refers to a structure that contains a relatively small number of monomeric units. As used herein, the term includes any structure having two or more monomeric units.

As used herein, the term "polymer" refers to a molecule that contains one or more monomer units.

As used herein, the term "hyperbranched" as it relates to a polymer refers to highly branched polymers that typically exhibit a globular structure. Hyperbranched polymers typically exhibit substantial irregularity in terms of branching pattern and structure, which typically results in substantial variation in molecular weight (often referred to as polydispersity).

One useful measure for assessing the amount of branching present in a polymer is the degree of branching. As used herein, the term "degree of branching" refers to the ratio of (a) the total number of branch repeat units included in a polymer to (b) the total number of repeat units included in the polymer. Hyperbranched polymers having any suitable degree of branching may be employed in compositions described herein. In certain embodiments, the hyperbranched polymers exhibit a degree of branching of at least about 4 to 20 monomer units per molecule.

Care should generally be exercised in interpreting degree of branching information for hyperbranched polymers. For example, certain hyperbranched polymers may exhibit a degree of branching of less than about 0.2, yet include one or more hyperbranched polymer portions (or subunits) that exhibit a degree of branching of greater than about 0.2. This may be the case, for example, when a hyperbranched polymer core is chain extended using long chains of linear repeat units. If sufficiently chain extended, the overall degree of branching for such a polymer may be less than about 0.2.

The presence of branched repeat units located away from the backbone contributes to the tree-like branching pattern of hyperbranched polymers. Hyperbranched polymers of the disclosure may have any suitable number of branched repeat units located away from the backbone. The hyperbranched polymers may include at least 1 or a plurality (e.g., 2, 3, 4, 5, 6, 7, 8, 9, 10 or more, and so on) of branched repeat units located away from the backbone.

As used herein, the term (meth)acrylic or (meth)acrylate refers to acrylic or methacrylic acid, esters of acrylic or methacrylic acid, and salts, amides, and other suitable derivatives of acrylic or methacrylic acid, and mixtures thereof. Illustrative examples of suitable (meth)acrylic monomers include, without limitation, the following methacrylate esters: methyl methacrylate, ethyl methacrylate, n-propyl methacrylate, n-butyl methacrylate (BMA), isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate (GMA), benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate. Example of suitable acrylate esters include, without limitation, methyl acrylate, ethyl acrylate, n-propyl acrylate, isopropyl acrylate, n-butyl acrylate (BA), n-decyl acrylate, isobutyl acrylate, n-amyl acrylate, n-hexyl acrylate, isoamyl acrylate, 2-hydroxyethyl acrylate, 2-hydroxypropyl acrylate, N,N-dimethylaminoethyl acrylate, N,N-diethylaminoethyl acrylate, t-butylaminoethyl acrylate, 2-sulfoethyl acrylate, trifluoroethyl acrylate, glycidyl acrylate, benzyl acrylate, allyl acrylate, 2-n-butoxyethyl acrylate, 2-chloroethyl acrylate, sec-butylacrylate, tert-butyl acrylate, 2-ethylbutyl acrylate, cinnamyl acrylate, crotyl acrylate, cyclohexyl acrylate, cyclopentyl acrylate, 2-ethoxyethyl acrylate, furfuryl acrylate, hexafluoroisopropyl acrylate, methallyl acrylate, 3-methoxybutyl acrylate, 2-methoxybutyl acrylate, 2-nitro-2-methylpropyl acrylate, n-octylacrylate, 2-ethylhexyl acrylate, 2-phenoxyethyl acrylate, 2-phenylethyl acrylate, phenyl acrylate, propargyl acrylate, tetrahydrofurfuryl acrylate and tetrahydropyranyl acrylate.

It was surprisingly found that hyperbranched polycarbonate polyols are low viscosity liquids at room temperature, which provide high functionality and high flexibility. The corresponding hyperbranched polycarbonate polyols are significantly lower in viscosity than their polyester analogues.

The present disclosure describes a process to prepare hyperbranched polycarbonate polyols at low temperature (such as 70° C. to 140° C., low pressure steam heating) while reaching higher transesterification yields than the process conducted at high-temperature. This permits the use of the lower cost dimethyl carbonate, yielding the same hyperbranched polycarbonate polyol but at a lower raw material and production cost. As a result, the hyperbranched polycarbonate polyols can be manufactured in a wider range of manufacturing facilities than the high-temperature process allows.

It has been found that hyperbranched polycarbonate polyols with low viscosity and high reactivity may be prepared at low temperature. A process of preparing a hyperbranched polycarbonate polyol through azeotropic transesterification at low temperature is provided. The hyperbranched polycarbonate polyol prepared by the disclosed process has low viscosity and is a liquid at room temperature. The hyperbranched polycarbonate polyol can be used in a variety of industrial applications, including but not limited to, urethanes for foams, inks, plastics, or coatings applications; and humectants, dispersants or emulsifiers, or solvents.

In one aspect, a process is provided for preparing a hyperbranched polycarbonate polyol, the process including contacting in a solvent a polyfunctional alcohol and an ester or a carbonate with a catalyst to form a reaction mixture; and heating the reaction mixture under azeotropic reflux conditions to form an alcohol or water. During the reaction, the alcohol or water by-product is removed from the reaction mixture under the azeotropic reflux conditions, thereby pushing the reaction forward.

The polyfunctional alcohol of the disclosed process may be aliphatic or aromatic and may contain two or more alcohol functionalities. In one embodiment, the polyfunctional alcohol includes one or more primary alcohol functionalities. In another embodiment, the polyfunctional alcohol has two or more primary alcohol functionalities. The polyfunctional alcohol can be branched or unbranched, substituted or unsubstituted, and have 3 to 26 carbon atoms. The polyfunctional alcohol is (cyclo)aliphatic and aliphatic. In yet another embodiment, the polyfunctional alcohol is a triol.

In one embodiment, the polyfunctional alcohol has a hydroxyl value of about 100 to about 2000 mg KOH per gram.

In some embodiments, the polyfunctional alcohol is glycerol, trimethyolmethane, trimethylolethane, trimethylolpropane, trimethylolbutane, 1,2,4-butanetriol, tris(hydroxymethyl)amine, tris(hydroxyethyl)amine, tris(hydroxypropyl) amine, pentaerythritol, diglycerol, triglycerol, polyglycerols, bis(trimethylolpropane), tris(hydroxymethyl) isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, a sugar, a sugar derivative, a polyetherol based on ethylene oxide, a polyetherol based on propylene oxide, a polyetherol based on butylene oxide, a polyesterol, or a combination of any two or more thereof.

In a further embodiment, the polyfunctional alcohol is a sugar, which is glucose. In yet another embodiment, the polyfunctional alcohol is a sugar derivative. Some examples of sugar derivatives include but are not limited to, sorbitol, mannitol, diglycerol, threitol, erythritol, adonitol (ribitol), arabitol (lyxitol), xylitol, dulcitol (galactitol), maltitol, or isomalt.

Other suitable polyfunctional alcohols include, but are not limited to, alkoxyamines and homopolymers of alkoxyamines. Some examples include but are not limited to triethanolamine and homopolymers of triethanolamine.

In certain embodiments, the polyfunctional alcohol is glycerol, trimethylolethane, trimethylolpropane, 1,2,4-butanetriol, pentaerythritol, a polyetherol based on ethylene oxide, a polyetherol based on propylene oxide, or a combination of any two or more thereof. In a further embodiment, the polyfunctional alcohol is an ethoxylated ethanol amine. In yet another embodiment, the polyfunctional alcohol is glycerol ethoxylate.

The ester of the disclosed process has a general formula of $R^1C(O)OR^2$ and may be aliphatic or aromatic and may contain one or more ester functionalities. The ester can be straight-chained or branched or substituted or un-substituted and can have 1-8 carbon atoms. Examples include but are not limited to methyl, ethyl, isopropyl, n-propyl, or n-butyl. In one embodiment, the ester is a $C_2$-$C_8$ ester. In a specific embodiment, the ester is a methyl ester. In a further embodiment, the ester is an anhydride of any ester disclosed herein.

During the azeotropic distillation of the disclosed process, the —$OR^2$ of the ester leaves to form the alcohol that is produced as a by-product throughout the reaction.

In an alternative embodiment, the polyfunctional alcohol can be contacted with a carbonate. The carbonate can be a simple carbonate of the general formula $R^1O(CO)OR^2$ wherein $R^1$ and $R^2$ is a straight chain or branched alkyl, cycloalkyl, or aryl group. In some embodiments, $R^1$ and $R^2$ is a straight chain or branched $C_1$-$C_{12}$ alkyl, $C_1$-$C_{12}$ cycloalkyl, or a $C_1$-$C_{12}$ aryl group. In some embodiments, $R^1$ is methyl, ethyl, or propyl, and $R^2$ is a straight chain or branched $C_1$-$C_{12}$ alkyl, $C_1$-$C_{12}$ cycloalkyl, or a $C_1$-$C_{12}$ aryl group. During the azeotropic distillation of the disclosed process, either the —$OR^1$ or —$OR^2$ leave to form the alcohol that is produced as a by-product in the reaction. For example, is $R^1$ is methyl, ethyl, or propyl, then the alcohol formed is methanol, ethanol, or propanol. In some embodiments, the carbonate is ethylene carbonate, 1,2-propylene carbonate, 1,3-propylene carbonate, or a combination of any two or more thereof.

In further embodiments, the carbonate is a dialkyl dicarbonate, dialkyl tricarbonate, or a combination of any two or more thereof. In some embodiments, the carbonate is dimethyl carbonate, diethyl carbonate, di-n-propyl carbonate, di-n-butyl carbonate, diisobutyl carbonate, or a combination of any two or more thereof. In a certain embodiment, the polyfunctional ester is dimethyl carbonate. In another embodiment, the polyfunctional ester is diethyl carbonate.

The amount of ester or carbonate used is from about 0.1 to about 1 equivalent of the ester or carbonate per 1 equivalent of the polyfunctional alcohol.

The polycarbonate polyol may be alkoxylated (linear or branched) 0 to 20 times, including ethoxylation, propoxylation, or butoxylation, in some embodiments. In further embodiments, the polycarbonate polyol may have from 4 to 20 monomer repeating units, in some embodiments. An illustrative representation of a polycarbonate polyol is:

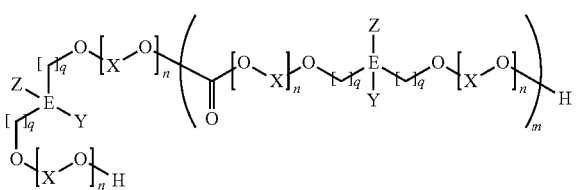

wherein: E is C or N; X is —CH$_2$CH$_2$—, —CH(CH$_3$)CH$_2$—, —CH$_2$(CH$_3$)CH—, —CH$_2$CH$_2$CH$_2$—, or —CH$_2$CH$_2$CH$_2$CH$_2$—; Y is —OH, —O—X—OH, —CH$_2$—O—X—OH, or —CH$_2$CH$_2$OH; Z is —H, —CH$_2$CH$_3$, —Y, or when E is N, Z is absent; 0<n≤20; 3<m≤19; and q is 1, 2, or 3.

The catalyst used for the process disclosed herein includes any catalyst that is capable of catalyzing a transesterification reaction which includes all catalysts listed in Otera, *Chem. Rev.* 1993, 93, 1449-1470. Some examples of catalysts include but are not limited to, alkali metal hydroxides, alkali metal carbonates, alkali metal hydrogen carbonates, preferably of sodium, of potassium or of cesium, tertiary amines, guanidines, ammonium compounds, phosphonium compounds, organoaluminum, organotin, organozinc, organotitanium, organozirconium or organobismuth compounds, and also catalysts of the kind known as double metal cyanide (DMC) catalysts, as described, for example, in DE 10138216 or in DE 10147712, both of which are hereby incorporated by reference in their entireties. In some embodiments, the catalyst is a strong acid, a strong base, a mild transesterification catalyst, a Lewis acid, or a Brønsted acid. In other embodiments, the catalyst is an alkali alkoxide, alkali hydroxide, or a titanium tetraalkoxide.

Specific examples of catalysts include but are not limited to potassium hydroxide, potassium carbonate, potassium hydrogen carbonate, diazabicyclooctane (DABCO), diazabicyclononene (DBN), diazabicycloundecene (DBU), imidazoles, such as imidazole, 1-methylimidazole or 1,2-dimethylimidazole, titanium tetrabutoxide, titanium tetraisopropoxide, dibutyltin oxide, dibutyltin dilaurate, tin dioctoate, zirconium acetylacetonate, or mixtures of any two or more thereof. In some embodiments, the catalyst is potassium hydroxide, sodium hydroxide, or sodium methoxide. In some embodiments, the catalyst is sodium methoxide.

The amount of catalyst used in the disclosed process is from about 400 ppm to about 1000 ppm based on one part of the polyfunctional alcohol (based on weight of the monomers (polyfunctional alcohol and carbonate or ester) without solvent). In some embodiments, the amount of catalyst is about 1000 ppm based on one part of polyfunctional alcohol (based on weight of the monomers (polyfunctional alcohol and carbonate or ester) without solvent).

The contacting of the polyfunctional alcohol with the ester or carbonate with a catalyst in a solvent may occur in different orderings. For example, the contacting of the polyfunctional alcohol with the ester or carbonate with a catalyst can occur simultaneously. Alternatively, the contacting of the polyfunctional alcohol with the ester or carbonate with a catalyst can occur sequentially wherein the order of addition varies. In some embodiments, the polyfunctional alcohol is added to the solvent, followed by the addition of the ester or carbonate, and subsequently the addition of the catalyst.

The solvent of the disclosed process can be any solvent that can function as an azeotropic solvent. An azeotropic solvent is a solvent that that forms an azeotrope with another material such as an alcohol or water. Examples of an azeotropic solvent include but are not limited to C$_5$-C$_{10}$ alkane or c C$_5$-C$_{10}$ cycloalkane. In some embodiments, the solvent is cyclohexane, toluene, dimethyl carbonate, or heptane. Other suitable examples include but are not limited to diethyl carbonate.

The polyfunctional alcohol, ester or carbonate, and catalyst are heated to achieve azeotropic reflux conditions to facilitate removal of an alcohol or water formed by the reaction. In one embodiment, the reaction mixture is heated to a temperature of about 70° C. to about 140° C. In an additional embodiment, the reaction mixture is heated from about 70° C. to about 110° C. In a further embodiment, the reaction mixture is heated to about 80° C. In some embodiments, the azeotropic mixture has a boiling point of about 54° C. The reaction is pushed forward by the removal of the alcohol or water by-product under the azeotropic reflux conditions.

The hyperbranched polycarbonate polyol formed by the process described herein have low viscosity and can be liquids at room temperature. The hyperbranched polycarbonate polyols prepared by the disclosed process have a viscosity of generally about 500 centipoise to greater than 100,000 centipoise at 25° C. For example, they can have a viscosity of about 900 centipoise to greater than 100,000 centipoise at 25° C. or about 1,000 centipoise to 30,000 centipoise at 25° C.

The hyperbranched polycarbonate polyols have less non-trans-esterified loose alkyl chain ends than hyperbranched polycarbonate polyols prepared at higher temperatures The hyperbranched polycarbonate polyols have hydroxyl values of about 100 to about 500 mg KOH per gram. In one embodiment, the hyperbranched polycarbonate polyol has a hydroxyl value of from about 250 to about 350 mg KOH per gram.

The hyperbranched polycarbonate polyols may contain at least 1 to 50 monomer units per molecule. In some embodiments, the polyol may contain 1 to 25 monomer units per molecule. In other embodiments, the polyol may contain 1 to 15 monomer units per molecule. The hyperbranched polycarbonate polyols may contain at least 2 to 50 monomer units per molecule. In some embodiments, the polyol may contain 2 to 25 monomer units per molecule. In other embodiments, the polyol may contain 2 to 15 monomer units per molecule.

In another aspect is provided a hyperbranched polycarbonate polyol prepared by the process disclosed herein.

EXAMPLES

Example 1

A low molecular weight polyol having 80 to 100% primary OH groups (polyol of different chemical nature (amino alcohols and trimethylolpropane, glycerol, pentaerythritol based alcohols that can be copolymers of ethylenoxide)) is dissolved, emulsified or dispersed in a process solvent. The entrainment solvent is chosen in such a way that it forms a low boiling point azeotrope with methanol, such as cyclohexane or heptane. The amount of entrainment solvent is as low as possible, but as much as necessary to maintain a strong reflux. To this mixture, a certain amount of dimethyl carbonate is charged. The amount of dimethyl carbonate can vary in a broad range from a 0.5 to 1 up to 1 to 4 equivalents of methyl carbonate per alcohol functionality. A catalyst is charged to the mixture, usually a solution of a strong base in methanol, such as potassium- or sodium hydroxide or sodium methoxide, in order to catalyze the transesterification.

The mixture is heated to total reflux through a packed distillation column with a splitting head. The reflux starts at about 80° C. and the column head temperature is about 74° C., which is the boiling temperature of the azeotrope of dimethylcarbonate and cyclohexane. After a short reaction time, c.a. 30 min, the column head temperature drops to about 50 to 60° C., such as 54.2° C., which is the azeotrope temperature of methanol and cyclohexane, which indicates the reaction progress. In the reaction mixture, methanol groups from the dimethyl carbonate are replaced by alcohol groups, thereby providing the high boiling point polyol.

The synthesis is driven towards the products by removing fractions of the distillate overhead by a splitting or trapping process. The azeotropic mixture of cyclohexane and methanol is separated after condensation into two distinct phases, with cyclohexane as the top phase. The cyclohexane top phase can be recycled and sent back into the reactor. As methanol is generated and removed in the azeotropic process, the reaction temperature can be increased to 120° C. If the reflux is slowing down, further cyclohexane must be added in order to maintain the azeotrope. After ca 8 hours reaction time, the dimethyl carbonate is converted to about 90% yield.

Subsequently, the catalyst is quenched by system soluble acids, such as phosphoric acid. The mixture is stripped free of solvent and any remaining monomers after which a clear and low viscosity polyol is obtained.

Illustrative Embodiments

The following is a description of non-limiting illustrative embodiments.

Para. A. A process of preparing a hyperbranched polycarbonate polyol, the process comprising: contacting a polyfunctional alcohol and an ester or carbonate with a catalyst in a solvent to form a reaction mixture; and heating the reaction mixture under azeotropic reflux conditions to form an alcohol or water; wherein: the alcohol or water is removed from the reaction mixture under the azeotropic reflux conditions.

Para. B. The process of Para. A, wherein heating the reaction mixture comprises heating to a temperature of about 70° C. to about 140° C.

Para. C. The process of Para. A or B, wherein the reaction mixture is heated from about 70° C. to about 110° C.

Para. D. The process of any one of Paras. A-C, wherein the reaction mixture is heated to about 80° C.

Para. E. The process of any one of Paras. A-D, wherein the hyperbranched polycarbonate polyol has a viscosity of about 500 centipoise to greater than 100,000 centipoise at 25° C.

Para. F. The process of any one of Paras. A-E, wherein the hyperbranched polycarbonate polyol has a viscosity of about 900 centipoise to greater than 100,000 centipoise at 25° C.

Para. G. The process of any one of Paras. A-F, wherein the hyperbranched polycarbonate polyol has a viscosity of about 1,000 centipoise to 30,000 centipoise at 25° C.

Para. H. The process of any one of Paras. A-G, wherein the hyperbranched polycarbonate polyol has a hydroxyl value of from about 100 to about 2000 mg KOH per gram.

Para. I. The process of any one of Paras. A-H, wherein the hyperbranched polycarbonate polyol has a hydroxyl value of from about 250 to about 350 mg KOH per gram.

Para. J. The process of any one of Paras. A-I, wherein the hyperbranched polycarbonate polyol has at least 1 to 50 monomer units per molecule.

Para. K. The process of any one of Paras. A-J, wherein the hyperbranched polycarbonate polyol has 1 to 25 monomer units per molecule.

Para. L. The process of any one of Paras. A-K, wherein the hyperbranched polycarbonate polyol has 1 to 15 monomer units per molecule.

Para. M. The process of any one of Paras. A-L, wherein the polyfunctional alcohol is a triol.

Para. N. The process of any one of Paras. A-M, wherein the polyfunctional alcohol comprises one or more primary alcohol functionalities.

Para. O. The process of any one of Paras. A-N, wherein the polyfunctional alcohol comprises glycerol, trimethylolmethane, trimethylolethane, trimethylolpropane, trimethylolbutane, 1,2,4-butanetriol, tris(hydroxymethyl)amine, tris(hydroxyethyl)amine, tris(hydroxypropyl)amine, pentaerythritol, diglycerol, triglycerol, polyglycerols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, a sugar, a sugar derivative, a polyetherol based on ethylene oxide, a polyetherol based on propylene oxide, a polyetherol based on butylene oxide, a polyesterol, or a combination of any two or more thereof.

Para. P. The process of any one of Paras. A-O, wherein the polyfunctional alcohol comprises a sugar which is glucose.

Para. Q. The process of any one of Paras. A-P, wherein the polyfunctional alcohol comprises a sugar derivative comprising sorbitol, mannitol, diglycerol, threitol, erythritol, adonitol (ribitol), arabitol (lyxitol), xylitol, dulcitol (galactitol), maltitol, or isomalt.

Para. R. The process of any one of Paras. A-Q, wherein the polyfunctional alcohol comprises glycerol, trimethylolethane, trimethylolpropane, 1,2,4-butanetriol, pentaerythritol, a polyetherol based on ethylene oxide, a polyetherol based on propylene oxide, or a combination of any two or more thereof.

Para. S. The process of any one of Paras. A-R, wherein the polyfunctional alcohol comprises an ethoxylated ethanol amine.

Para. T. The process of any one of Paras. A-S, wherein the polyfunctional alcohol comprises glycerol ethoxylate.

Para. U. The process of any one of Paras. A-T, wherein the ester is a C2-C8 ester or an anhydride.

Para. V. The process of any one of Paras. A-U, wherein the carbonate comprises ethylene carbonate, 1,2-propylene carbonate, 1,3-propylene carbonate, or a combination of any two or more thereof.

Para. W. The process of any one of Paras. A-V, wherein the carbonate comprises a dialkyl dicarbonate, dialkyl tricarbonate, or a combination of any two or more thereof.

Para. X. The process of any one of Paras. A-W, wherein the carbonate is dimethyl carbonate, diethyl carbonate, di-n-propyl carbonate, di-n-butyl carbonate, diisobutyl carbonate, or a combination of any two or more thereof.

Para. Y. The process of any one of Paras. A-X, wherein the carbonate is dimethyl carbonate.

Para. Z. The process of any one of Paras. A-Y, wherein the carbonate is diethyl carbonate.

Para. AA. The process of any one of Paras. A-Z, wherein the ester is a methyl ester.

Para. AB. The process of any one of Paras. A-AA, wherein the catalyst is a strong acid, a strong base, a mild transesterification catalyst, a Lewis acid, or a Brønsted acid.

Para. AC. The process of any one of Paras. A-AB, wherein the catalyst is an alkali alkoxide, an alkali hydroxide, or a titanium tetraalkoxide.

Para. AD. The process of any one of Paras. A-AC, wherein the catalyst comprises potassium hydroxide, sodium hydroxide, or sodium methoxide.

Para. AE. The process of any one of Paras. A-AD, wherein the catalyst present is from about 400 ppm to about 1000 ppm based on one part of polyfunctional alcohol.

Para. AF. The process of any one of Paras. A-AE, wherein the catalyst present is at about 1000 ppm based on one part of polyfunctional alcohol.

Para. AG. The process of any one of Paras. A-AF, wherein the azeotropic reflux conditions comprises an azeotropic mixture having a boiling point of about 54° C.

Para. AH. The process of any one of Paras. A-AG, wherein the solvent comprises C5-C10 alkane, $C_5$-$C_{10}$ cycloalkane, or an aromatic solvent.

Para. AI. The process of any one of Paras. A-AH, wherein the solvent is cyclohexane, toluene, dimethyl carbonate, or heptane.

Para. AJ. A hyperbranched polycarbonate polyol made by the process of any one of Paras. A-AI.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process of preparing a hyperbranched polycarbonate polyol, the process comprising:
    contacting a polyfunctional alcohol and an ester or carbonate with a catalyst in a solvent to form a reaction mixture; and
    heating the reaction mixture under azeotropic reflux conditions to form an alcohol or water;
    wherein:
        the alcohol or water is removed from the reaction mixture under the azeotropic reflux conditions;
        the heating the reaction mixture comprises low pressure steam heating to a temperature of about 70° C. to about 140° C.; and
        the hyperbranched polycarbonate polyol is a liquid at room temperature and has a viscosity of about 500 centipoise to 100,000 centipoise at 25° C.

2. The process of claim 1, wherein heating the reaction mixture comprises heating to a temperature of about 70° C. to about 110° C.

3. The process of claim 2, wherein the reaction mixture is heated to about 80° C.

4. The process of claim 1, wherein the hyperbranched polycarbonate polyol has a viscosity of about 1,000 centipoise to 30,000 centipoise at 25° C.

5. The process of claim 1, wherein the hyperbranched polycarbonate polyol has a hydroxyl value of from about 100 to about 2000 mg KOH per gram.

6. The process of claim 1, wherein the hyperbranched polycarbonate polyol has 1 to 50 monomer units per molecule.

7. The process of claim 1, wherein the polyfunctional alcohol comprises one or more primary alcohol functionalities.

8. The process of claim 1, wherein the polyfunctional alcohol comprises glycerol, trimethylolmethane, trimethylolethane, trimethylolpropane, trimethylolbutane, 1,2,4-butanetriol, tris(hydroxymethyl)amine, tris(hydroxyethyl)amine, tris(hydroxypropyl)amine, pentaerythritol, diglycerol, triglycerol, polyglycerols, bis(trimethylolpropane), tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, a sugar, a sugar derivative, a polyetherol based on ethylene oxide, a polyetherol based on propylene oxide, a polyetherol based on butylene oxide, a polyesterol, or a combination of any two or more thereof.

9. The process of claim 8, wherein the polyfunctional alcohol comprises a sugar derivative comprising sorbitol, mannitol, diglycerol, threitol, erythritol, adonitol (ribitol), arabitol (lyxitol), xylitol, dulcitol (galactitol), maltitol, or isomalt.

10. The process of claim 8, wherein the polyfunctional alcohol comprises glycerol, trimethylolethane, trimethylolpropane, 1,2,4-butanetriol, pentaerythritol, a polyetherol based on ethylene oxide, a polyetherol based on propylene oxide, or a combination of any two or more thereof.

11. The process of claim 1, wherein the polyfunctional alcohol comprises an ethoxylated ethanol amine.

12. The process of claim 1, wherein the ester is a $C_2$-$C_8$ ester or an anhydride.

13. The process of claim 1, wherein the carbonate comprises ethylene carbonate, 1,2-propylene carbonate, 1,3-propylene carbonate, or a combination of any two or more thereof.

14. The process of claim 1, wherein the carbonate comprises a dialkyl dicarbonate, dialkyl tricarbonate, or a combination of any two or more thereof.

15. The process of claim 1, wherein the carbonate is dimethyl carbonate, diethyl carbonate, di-n-propyl carbonate, di-n-butyl carbonate, diisobutyl carbonate, or a combination of any two or more thereof.

16. The process of claim 1, wherein the ester is a methyl ester.

17. The process of claim 1, wherein the catalyst is an alkali alkoxide, an alkali hydroxide, or a titanium tetraalkoxide.

18. The process of claim 1, wherein the azeotropic reflux conditions comprises an azeotropic mixture having a boiling point of about 54° C.

19. The process of claim 1, wherein the solvent is cyclohexane, toluene, dimethyl carbonate, or heptane.

20. The process of claim 1, wherein the polyfunctional alcohol and an ester or carbonate is converted to the hyperbranched polycarbonate polyol at about 90% yield.

* * * * *